United States Patent Office 3,077,466
Patented Feb. 12, 1963

3,077,466
POLYESTERS FROM DISULFONYL DICARBOXYLIC ACIDS AND ESTERS
John R. Caldwell, Russell Gilkey, and Winston J. Jackson, Jr., Kingsport, Tenn., assignors to Eastman Kodak Company, Rochester, N.Y., a corporation of New Jersey
No Drawing. Filed Oct. 7, 1955, Ser. No. 539,268
15 Claims. (Cl. 260—75)

This invention relates to high melting crystalline linear polyesters of primarily aliphatic character which can be prepared by condensing (a) an aliphatic disulfonyldicarboxylic compound containing two symmetrically placed sulfonyl groups separated by a polymethylene radical, with (b) a glycol. The condensation process is essentially the same as the procedural techniques now well known in the art pertaining to high-melting, linear, crystalline polyesters. The polyesters produced have softening points well up in the fiber-forming range. Fibers prepared therefrom dye to practical shades at atmospheric pressure with cellulose acetate dyes. Films therefrom can be employed as wrapping materials, insulators, photographic film base, etc. Useful molding compositions can also be prepared therefrom. This invention also relates to the aliphatic disulfonyldicarboxylic compounds per se and to their preparation.

Linear aliphatic polyesters have long been known, for example, Carothers and Hill in 1932 described, among others, polyethylene sebacate which melts at about 75° C., and polyethylene succinate which melts at about 97° C. These polyesters are typical of the linear aliphatic polyesters. Moreover, linear polyesters from aliphatic sulfonyl dicarboxylic acids are also of generally low melting character. For example, a linear polyester from ethylene glycol and 4,4'-sulfonyldibutyric acid melts at about 80–90° C. and hence is of no value as a molding plastic, a film, or a fiber. One commonly used way of producing higher melting polymeric compositions using such aliphatic acids is to condense them with polyfunctional compounds so as to form cross-linked polymers which are not linear in character. For example, an aliphatic sulfone acid can be condensed with a polyamine containing two primary amino groups and one or more secondary amino groups. Another way of using such aliphatic sulfone acids in high melting polymers is to employ such acids merely as modifiers in polymeric compositions which depend for their high melting points upon other constituents.

It has now been discovered that linear polyesters having substantially no cross linking and characterized by unusually high melting points and high crystallinity can be prepared by employing a disulfonyldicarboxylic compound (acid or ester) wherein the two sulfonyl radicals are separated by at least two carbon atoms and the carboxyl radicals are separated from the sulfonyl radicals by at least 3 carbon atoms. This is quite unexpected in view of the teachings and inferences of the prior art.

It is an object of the invention to provide new linear polyesters derived from the disulfonyldicarboxylic compounds defined by the general formula set forth hereinbelow.

A further object of the invention is to provide polyester compositions derived from these disulfonyldicarboxylic compounds which have high melting points, are crystalline, and can be advantageously employed for the manufacture of films, fibers, extruded objects, molded shapes, etc.

An additional object of the invention is to provide new fibers derived from a novel polyester which fibers can be dyed to practical shades at atmospheric pressure with cellulose acetate dyes.

A still further object of the invention is to provide new films derived from novel polyesters which films can be employed as the support for either black and white or color-type photographic emulsions of silver halides, gelatin, etc.

Another object of the invention is to provide novel aliphatic disulfonyldicarboxylic acids as defined by the general formula set forth hereinbelow.

A further object of the invention is to provide a process for preparing these novel disulfonyldicarboxylic acids.

These and other objects which will appear hereinafter can be achieved in accordance with the invention described herein.

According to one embodiment of the invention, the novel disulfonyldicarboxylic compounds having the following formula are provided:

wherein $x$ represents an integer of from 2 to 4, R represents a radical selected from the group consisting of a $—(CH_2)_3—$ and a $—C(CH_3)_2—CH_2$ radical, and $R_1$ represents a substituent selected from the group consisting of a hydrogen atom and an alkyl radical containing from 1 to 6 carbon atoms.

According to another embodiment of the invention these novel disulfonyldicarboxylic compounds can be prepared by the following series of reactions wherein $x$ represents either 2, 3 or 4:

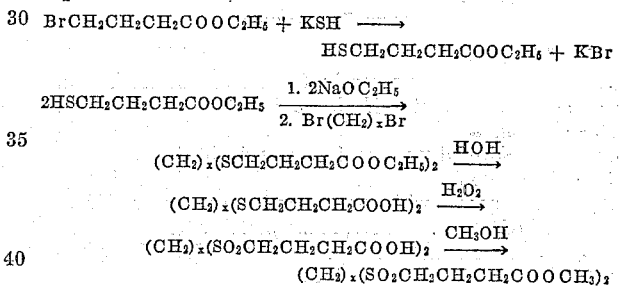

Ethyl 4-bromobutyrate is converted to the mercapto ester with potassium hydrosulfide. Two moles of the sodium salt of the mercapto ester are then treated with one mole of the dibromide. The product, a 4,4'-polymethylenesulfonyldibutyric acid, diethyl ester, is hydrolyzed to the dibasic acid and then treated with hydrogen peroxide to form the disulfone. Esterification is accomplished with methanol and acid catalyst.

All steps are characterized by good yields. This process of the invention is valuable for the production of 4,4'-polymethylenesulfonyldibutyric acids and their esters, which can be used as intermediates in the manufacture of polyesters and polyamides. The esters can also be used as plasticizers for cellulose derivatives and vinyl polymers by incorporating a minor proportion of such plasticizers in cellulose acetate, cellulose nitrate, polyvinyl chloride, polymeric methyl methacrylate, etc.

The following procedures illustrate a preferred manner of practicing this embodiment of this invention but are not intended to limit the invention unless otherwise specifically indicated:

EXAMPLE 1

*Step (1A).—Ethyl 4-Mercaptobutyrate*
*(a New Compound)*

A solution containing 300 g. of potassium hydroxide in 1200 cc. of methanol was cooled in an ice water bath and saturated with hydrogen sulfide. While hydrogen sulfide was slowly bubbled into this stirred solution, 780 g. of ethyl 4-bromobutyrate was added at such a rate that the temperature did not rise above 25°. The reaction mixture was stirred at 25° for 2 hr. (hydrogen sulfide continuously added), and then the potassium bromide was removed by filtration. The filtrate was diluted with 2 l. of water and the product (lower layer) collected. The potassium bromide residue was thoroughly washed with isopropyl ether and this ethereal solution was then used for extracting the aqueous solution. The product, combined with the ethereal solution, was washed with water, dried with sodium sulfate, and distilled. The mercapto ester, B.P. 68–70°/5 mm. $n_D^{20}$ 1.4580, was obtained in yields of 80–85% (475–500 g.).

*Step (1B).—4,4'-Ethylenedithiodibutyric Acid, Diethyl Ester (a New Compound)*

An alcoholic solution of sodium ethoxide was prepared by dissolving 25.3 g. (1.1 moles) of sodium in 450 cc. of absolute ethanol. This solution was then cooled, and 155 g. (1.05 moles) of ethyl 4-mercaptobutyrate was slowly added. While the solution was cooled in an ice water bath, 94 g. (0.50 mole) of ethylene dibromide was slowly added with stirring (very exothermic reaction). The mixture was then refluxed with stirring for 2 hr. The sodium bromide could not be filtered since it was in colloidal form. When the mixture was diluted with water, the product separated as an upper layer. It was taken up in isopropyl ether, and the aqueous solution was extracted with isopropyl ether. The combined ether solutions were washed with water, dried with sodium sulfate, and concentrated under reduced pressure (100°/3 mm.). The orange residual oil weighed 145 g. (90% yield).

*Step (1C).—4,4'-Ethylenedithiodibutyric Acid (a New Compound)*

To 145 g. of the crude 4,4'-ethylenedithiodibutyric acid, diethyl ester dissolved in 400 cc. of hot acetic acid was added 56 cc. of sulfuric acid in 216 cc. of water. This solution was refluxed for 7 hr. while the ethyl acetate which formed was continuously distilled off. When the solution cooled, the product crystallized. This was collected, washed with water, and recrystallized from 1400 cc. of water. Transparent platelets (90 g., 75% yield) were obtained, M.P. 104–106°. Neutral equivalent: Calcd. 133. Found: 133.

*Step (1D).—4,4'-Ethylenedisulfonyldibutyric Acid (a New Compound)*

A stirred solution containing 72 g. of ethylenedithiodibutyric acid in 400 cc. of acetic acid was slowly treated with 136 g. of 30% hydrogen peroxide. An ice water bath kept the temperature down to 50–60°. The solution was then refluxed with stirring for 1 hr. During this time the product began crystallizing. It was collected and washed with ethanol; yield 86.5 g. (97%), M.P. 220–224°. Recrystallization from 870 cc. of 88% formic acid gave 83 g. of tiny white crystals melting at 221–224.5°.

*Analysis.*—Calcd. for $C_{10}H_{18}O_8S_2$: S, 19.41. Found S, 19.47.

*Step (1E).—4,4'-Ethylenedisulfonyldibutyric Acid, Dimethyl Ester (a New Compound)*

A mixture containing 68 g. of 4,4'-ethylenedisulfonyldibutyric acid, 4 l. of methanol, and 3 g. of p-toluenesulfonic acid was refluxed with stirring for 12 hr. During this time the acid slowly went into solution as it reacted. When the solution cooled, the product crystallized. This was collected and washed with methanol. Colorless plates (69 g., 94% yield) were obtained which melted at 130–132°. Recrystallization from 4 l. of methanol gave 61 g., M.P. 131–132°.

*Analysis.*—Calcd. for $C_{12}H_{22}O_8S_2$: S, 17.89. Found S, 17.84.

EXAMPLE 2

*Steps (2A and B).—4,4'-Trimethylenedithiodibutyric Acid, Diethyl Ester (a New Compound)*

The sodium salt of ethyl 4-mercaptobutyrate in ethanol was treated with trimethylene dibromide under the same conditions used for the preparation of 4,4'-ethylenedithiodibutyric acid, diethyl ester in Example 1.

*Step (2C).—4,4'-Trimethylenedithiodibutyric Acid (a New Compound)*

The above ester was hydrolyzed to the dibasic acid as in Example 1. This new acid melted at 94–95°. Neutral equivalent: Calcd. 140. Found: 140.

*Step (2D).—4,4'-Trimethylenedisulfonyldibutyric Acid (a New Compound)*

The above dithiodibutyric acid was oxidized to the disulfonyl compound with hydrogen peroxide in a procedure similar to that in Example 1. The product melted at 238–240°.

*Analysis.*—Calcd. for $C_{11}H_{10}S_2O_8$: S, 18.62. Found: 18.37.

*Step (2E).—4,4'-Trimethylenedisulfonyldibutyric Acid, Dimethyl Ester (a New Compound)*

The disulfonyldibutyric acid was esterified with methanol (p-toluenesulfonic acid catalyst) by heating for 4 hr. in a rocking autoclave at 160°. The product, recrystallized from water, consisted of colorless plates melting at 164–165°.

*Analysis.*—Calcd, for $C_{13}H_{24}S_2O_8$: S, 17.22. Found: S, 17.23.

EXAMPLE 3

*Steps (3A–D).—4,4'-Tetramethylenedisulfonyldibutyric Acid (a New Compound)*

In a manner similar to that in Example 1 (1A–D) this compound was prepared starting with ethyl 4-mercaptobutyrate and tetramethylene chloride.

*Analysis.*—Calcd. for $C_{12}H_{22}O_8S_2$: S, 17.89. Found: 17.96.

*Step (3E).—4,4'-Tetramethylenedisulfonyldibutric Acid Dimethyl Ester (a New Compound)*

The above acid was esterified with methanol by the method used in Example 2.

*Analysis.*—Calcd. for $C_{14}H_{26}O_8S_2$: S, 16.59. Found: S, 16.51.

Other species within the above general formula defining these novel disulfonyldicarboxylic compounds can be similarly prepared by employing the isomers or homologs of the compounds used in the preceding examples.

According to an other embodiment of the invention the disulfonyldicarboxylic compounds defined above can be converted into high melting, crystalline, linear polyesters by a process which comprises condensing at least one of these compounds with a glycol containing from 2 to 12 carbon atoms employing the procedural techniques which are now well known in the art relating to the preparation of linear high melting polyesters of this general type.

The techniques described in the prior art are generally set forth in connection with the employment of an aromatic dibasic acid or ester but they are equally applicable to the employment of the disulfonyldicarboxylic acid or ester thereof with which this invention is primarily concerned.

It is generally advantageous to employ the disulfonyldicarboxylic acid in the form of its lower alkyl diesters such as the methyl, ethyl, or butyl esters. However, the free acids can also be employed by preferably first heating such an acid with an excess of the desired glycol in order to esterify the carboxyl groups of the free acid.

The condensation reaction is advantageously conducted at a temperature from about 175° to about 250° C. in an inert atmosphere. During the course of the condensation reaction the pressure is advantageously reduced to form a vacuum whereby a highly polymeric product can be advantageously produced.

The preparation of these polyesters can be most advantageously carried out in the presence of a condensation catalyst of the ester interchange type. These catalysts have been set forth in considerable detail in the prior art and are all believed to be effective to the preparation of polyesters covered by the present invention. Preferred catalysts are titanium compounds, tin compounds, and aluminum compounds. Especially advantageous catalysts are defined in copending applications Serial Nos. 313,072, 313,075, 313,077, and 313,078 filed on October 3, 1952, by J. R. Caldwell et al., which applications have now issued as U.S. Patents 2,720,502 (Oct. 11, 1955), 2,727,881 (Dec. 20, 1955), 2,720,506, (Oct. 11, 1955) and 2,720,507 (Oct. 11, 1955), respectively.

In addition to the melt polymerization of polyesters as referred to above, another well-known technique consists of the preliminary formation of a prepolymer by carrying out the process described above to a point where the molten polyester is only sufficiently polymerized to have an inherent viscosity of about 0.1 to about 0.3, more or less. The prepolymer is then advantageously cooled to a solid, ground to a powder and further polymerized by heating the powder in an inert atmosphere with stirring at a gradually increasing temperature which is not sufficiently high to conglomerate the powdered particles. This heating is continued to a temperature generally well above about 200° C. until an inherent viscosity of the desired value is obtained. A vacuum may be employed, if desired, but is not essential.

The glycols which can be advantageously employed in the preparation of the polyesters covered by this invention include ethylene glycol, trimethylene glycol, other polymethylene glycols containing up to about 12 carbon atoms including 2,2-dimethyl-1,3-propanediol and other gem-dialkyl glycols. In addition, cyclic aliphatic glycols and aromatic glycols can also be employed. A cyclic aliphatic glycol of unusual value is 1,4-cyclohexane dimethanol. The aromatic glycols which can be employed have the hydroxyl radicals attached to one or more methylene radicals which separate the hydroxyl radicals from the aromatic structure from which the aromatic glycol was derived. It is especially advantageous in most instances to employ the aliphatic glycols containing from 1 to 6 carbon atoms.

The disulfonyldicarboxylic compounds which can be employed in accordance with this invention can be supplemented by the addition of one or more different aliphatic or aromatic dicarboxylic acids or esters so as to obtain interpolyesters which are modified by the characteristics of the added dicarboxylic compound. These added dicarboxylic compound are generally employed in the form of their diesters such as the lower alkyl diesters containing from 1 to 6 carbon atoms. Examples of such modifying compounds include succinic acid esters, adipic acid esters, sebacic acid esters, dimethylmalonic acid esters, p,p'-sulfonyldibenzoic acid esters, terephthalic acid esters, 1,2-di(p-carboxyphenoxy)ethane esters, p,p'-diphenic acid esters, 1,2-di(p-carboxyphenyl) ethane esters, 4,4'-benzophenonedicarboxylic acid esters, etc.

By employing various modifying acids and/or glycols the polyesters produced in accordance with this invention can be made to acquire any desired wide range of melting points, varying degrees of crystallinity and modified dye receptivity, all in accordance with the requirements of any particular situation.

This invention can be further illustrated by the following examples of preferred embodiments although it will be understood that these examples are included merely for purposes of illustration and are not intended to limit the scope of the invention unless otherwise specifically indicated:

EXAMPLE 4

Three hundred and fifty-eight grams (1.0 mole) of 4,4'-ethylenedisulfonyl dibutyric acid, dimethyl ester and 124 g. (2.0 mole) of ethylene glycol were placed in a reaction vessel equipped with a stirrer, a distillation column, and an inlet for purified nitrogen. A slurry of 0.1 g. active titanium dioxide in 10 ml. of butyl alcohol was added as catalyst and the mixture was stirred at 190–200° C. in an atmosphere of purified nitrogen. Methyl alcohol distilled from the flask as the ester interchange took place. When the evolution of methyl alcohol had practically stopped, the temperature was raised to 225–230° C. and held for 15 minutes. A vacuum of 0.1 mm. was then applied. After 2–3 hours of stirring under vacuum, a viscous melt was obtained. The vacuum was broken to nitrogen and the polymer allowed to cool in an atmosphere of purified nitrogen. The inherent viscosity of the polyester, as determined in a solution of 60 phenol-40 tetrachloroethane, was 0.61. Determination of the crystalline melting point on the hot stage of a microscope under crossed Nicols gave a value of 195–197° C.

This polyester is especially valuable for the production of film and fibers by the melt-extrusion process. The polymer is highly crystalline so that it can be heat set after orientation to give clear, flexible films with a high heat distortion temperature and fibers with a high softening point.

EXAMPLE 5

Three hundred and seventy-two grams (1.0 mole) of 4,4'-trimethylenedisulfonyl dibutyric acid, dimethyl ester and 124 g. (2.0 mole) of ethylene glycol were placed in a reaction vessel as described in Example 4. A solution of 0.08 g. titanium tetrabutoxide in 10 ml. of butyl alcohol was added as catalyst. After heating at 190–200° C. for 1 hour the ester interchange was practically complete and the methyl alcohol removed by distillation. The temperature was raised to 240° C. and after 15 minutes, a vacuum of 0.2 mm. was applied. A viscous melt was obtained after 2 hours under vacuum with constant stirring. The polymer was allowed to cool in an atmosphere of purified nitrogen and then granulated. The inherent viscosity was 0.75 and the crystalline melting point, 218–222° C. The polymer was white in color.

This polyester is especially valuable for the production of fibers by the melt spinning process. The fibers draw and heat set easily and dye with cellulose acetate dyes.

EXAMPLE 6

Three hundred and eighty six grams (1.0 mole) of 4,4'-tetramethylenedisulfonyl dibutyric acid, dimethyl ester and 124 g. (2.0 mole) of ethylene glycol were placed in a reaction vessel as described in Example 4. A solution of 0.1 g. dibutyl tin diacetate in 10 ml. butyl alcohol was added as catalyst. The heating schedule described in Example 2 was followed. The inherent viscosity of the product was 0.58 and the crystalline melting point, 185–189° C. Fibers drawn from the melt drafted well and on heating become highly crystalline. The product was valuable as a photographic film base.

EXAMPLE 7

Four hundred and eighty-four grams (1.0 mole) of 3,3'-trimethylenedisulfonyl dipivalic acid, dibutyl ester and 208 g. (2.0 mole) of 2,2'-dimethyl-1,3-propanediol were placed in a reaction vessel as described in Example 4. A solution of 0.05 g. magnesium titanium butoxide in 10 ml. butyl alcohol was added as catalyst. The stirred reaction mixture was heated at 220° C. for 2 hours during which time the butyl alcohol evolved was removed by distillation. The temperature was raised to 250° C. and maintained there for 15 minutes. A vacuum of 0.1 mm. was then applied for 10 minutes and the reaction mixture was poured into ice water. The prepolymer thus formed was dried and ground to a powder.

It had an inherent viscosity of 0.2. The powdered prepolymer was further polymerized by heating in a flask at 200° C. for 4 hours with stirring under vacuum of 0.1 mm. The final polymer had an inherent viscosity of 0.96.

EXAMPLE 8

A polyester having the composition: 1 mole 4,4'-trimethylenedisulfonyl dibutyric acid +1 mole trimethylene glycol was prepared according to the procedure in Example 5. It had an inherent viscosity of 0.72 and was useful for the manufacture of films and fibers.

EXAMPLE 9

A copolyester haivng the following composition was prepared: 0.7 mole 4,4'-ethylenedisulfonyl dibutyric acid +0.3 mole p,p'-sulfonyldibenzoic acid +1.0 mole 1,4-butanediol. This product was very crystalline and high melting and was valuable for making films and fibers by the melt-extrusion process.

EXAMPLE 10

A copolyester having the following composition was prepared: 0.8 mole 4,4'-trimethylenedisulfonyldibutyric acid +0.2 mole terephthalic acid +1.0 mole ethylene glycol. This product was useful in the manufacture of films and fibers.

EXAMPLE 11

A copolyester having the following composition was prepared: 0.2 mole 3,3'-trimethylenedisulfonyl dipivalic acid +0.8 mole terephthalic acid +1 mole ethylene glycol. It was used in the production of fibers which dyed readily with cellulose acetate dyes.

Other valuable polyesters can be similarly prepared as taught in the more general description of the invention given above. These polyesters are unexpectedly high melting and have excellent receptivity to dyes so that fibers thereof are of especially great utility for the manufacture of fabrics, clothing, etc.

The structure of the polyesters of this invention comprise repeating units having the following formula:

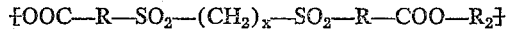

wherein $R_2$ represents the radical obtained by removing both hydroxyl groups from a glycol containing from 2 to 12 carbon atoms, $x$ represents an integer of from 2 to 4, each R represents a radical selected from the group consisting of a $-(CH_2)_3-$ radical and a

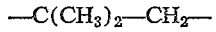

radical.

We claim:

1. A process for preparing a high melting, crystalline, linear polyester of substantially aliphatic character which comprises condensing at a temperature of from about 175° C. to about 250° C. in an inert atmosphere in the presence of a condensing agent (a) an aliphatic disulfonyl-dicarboxylic compound having the following general formula:

$$R_1OOC-R-SO_2-(CH_2)_x-SO_2-R-COOR_1$$

wherein $x$ represents an integer of from 2 to 4, each R represents a radical selected from the group consisting of a $-(CH_2)_3-$ radical and a $-C(CH_3)_2-CH_2-$ radical, and each $R_1$ represents a substituent selected from the group consisting of a hydrogen atom and an alkyl radical containing from 1 to 6 carbon atoms, with (b) a glycol selected from the group consisting of (1) a polymethylene glycol containing from 2 to 12 carbon atoms, (2) a gem-dialkyl polymethylene glycol containing from 5 to 12 carbon atoms, (3) a cyclic aliphatic glycol containing from 6 to 12 carbon atoms, and (4) an aromatic glycol containing from 8 to 12 carbon atoms wherein the two hydroxyl radicals are each attached to a methylene radical interposed between the hydroxy radical and the aromatic structure.

2. A process as defined in claim 1 wherein the condensation is carried out at a temperature of from about 175° C. to about 250° C. employing a vacuum during the latter part of the condensation.

3. A process as defined in claim 2 wherein an ester interchange catalyst is employed as a condensing agent.

4. A process as defined in claim 3 wherein the disulfonyl-dicarboxylic compound has the following formula:

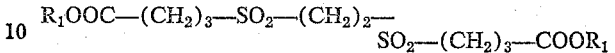

and the glycol is ethylene glycol.

5. A process as defined in claim 3 wherein the disulfonyl-dicarboxylic compound has the following formula:

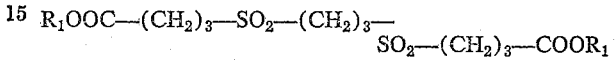

and the glycol is ethylene glycol.

6. A process as defined in claim 3 wherein the disulfonyl-dicarboxylic compound has the following formula:

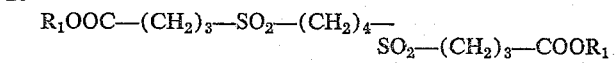

and the glycol is ethylene glycol.

7. A process as defined in claim 3 wherein the disulfonyl-dicarboxylic compound has the following formula:

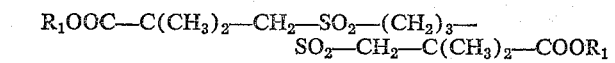

and the glycol is 2,2-dimethyl-1,3-propanediol.

8. A process as defined in claim 3 wherein the disulfonyl-dicarboxylic compound has the following formula:

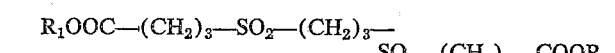

and the glycol is trimethylene glycol.

9. A highly polymeric, crystalline, high melting linear polyester consisting essentially of a series of repeating units having the following formula:

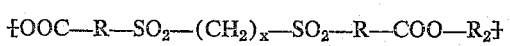

wherein $R_2$ represents the radical obtained by removing both hydroxy groups from a glycol containing from 2 to 12 carbon atoms selected from the group consisting of (1) a polymethylene glycol containing from 2 to 12 carbon atoms, (2) a gem-dialkyl polymethylene glycol containing from 5 to 12 carbon atoms, (3) a cyclic aliphatic glycol containing from 6 to 12 carbon atoms, and (4) an aromatic glycol containing from 8 to 12 carbon atoms wherein the two hydroxyl radicals are each attached to a methylene radical interposed between the hydroxy radical and the aromatic structure, $x$ represents an integer of from 2 to 4, and each R represents a radical selected from the group consisting of a $-(CH_2)_3-$ radical and a $C(CH_3)_2-CH_2-$ radical, said series of repeating units being terminated at the carboxyl end with an $R_1$ radical and at the $R_2$ end with a hydroxyl radical, $R_1$ being a member selected from the group consisting of a hydrogen atom and an alkyl radical containing from 1 to 6 carbon atoms.

10. A polyester as defined in claim 9 wherein $x$ is 2, each R represents a $-(CH_2)_3-$ radical and $R_2$ is an ethylene radical.

11. Polyesters defined in claim 9 wherein $x$ is 3, each R represents a $-(CH_2)_3-$ radical and $R_2$ is an ethylene radical.

12. A polyester as defined in claim 9 wherein $x$ is 4, each R represents a $-(CH_2)_3-$ radical and $R_2$ represents an ethylene radical.

13. A polyester as defined in claim 9 wherein $x$ is 3, each R represents a $-C(CH_3)_2-CH_2-$ radical and $R_2$ represents a 2,2-dimethyl-1,3-propylene radical.

14. A polyester as defined in claim 9 wherein $x$ is 3, each R represents a $-(CH_2)_3-$ radical and $R_2$ represents a trimethylene radical.

15. A highly polymeric crystalline, high melting linear polyester consisting essentially of a series of repeating units having the following formula:

$$\{OOC(CH_2)_3SO_2(CH_2)_xSO_2(CH_2)_3COO-R'''\}$$

wherein $x$ represents an integer of from 2–4 and where $R'''$ is divalent hydrocarbon radical of 2–10 carbon atoms in which any cyclic structure is separated from each of the indicated valences of —$R'''$— by a methylene group only.

References Cited in the file of this patent

UNITED STATES PATENTS

| | | |
|---|---|---|
| 2,393,327 | Langkammerer | Jan. 22, 1946 |
| 2,427,640 | Whitehill | Sept. 16, 1947 |
| 2,571,251 | Jones | Oct. 16, 1951 |
| 2,602,816 | Gregory et al. | July 8, 1952 |
| 2,614,126 | Caldwell | Oct. 14, 1952 |

FOREIGN PATENTS

| | | |
|---|---|---|
| 620,494 | Great Britain | Mar. 25, 1949 |